(12) United States Patent
Hirano et al.

(10) Patent No.: US 7,149,963 B2
(45) Date of Patent: Dec. 12, 2006

(54) DOCUMENT REVISION SUPPORT PROGRAM AND COMPUTER READABLE MEDIUM ON WHICH THE SUPPORT PROGRAM IS RECORDED AND DOCUMENT REVISION SUPPORT DEVICE

(75) Inventors: Ryota Hirano, San Jose, CA (US); Koji Kusumoto, San Jose, CA (US); Kazushige Oikawa, San Jose, CA (US)

(73) Assignee: K-Plex Inc., San Jose, CA (US)

( * ) Notice: Subject to any disclaimer, the term of this patent is extended or adjusted under 35 U.S.C. 154(b) by 415 days.

(21) Appl. No.: 10/674,390

(22) Filed: Oct. 1, 2003

(65) Prior Publication Data
US 2005/0251738 A1  Nov. 10, 2005

(30) Foreign Application Priority Data
Oct. 2, 2002  (JP)  ............... 2002-289628

(51) Int. Cl.
  G06F 15/00  (2006.01)
(52) U.S. Cl. .................. 715/511; 715/513; 715/531
(58) Field of Classification Search ............... 715/511, 715/513, 531
See application file for complete search history.

(56) References Cited

U.S. PATENT DOCUMENTS

| 5,983,241 | A  |   | 11/1999 | Hoshino et al. |
|---|---|---|---|---|
| 6,061,697 | A  |   | 5/2000  | Nakao et al. |
| 6,460,052 | B1 |   | 10/2002 | Thomas et al. |
| 6,681,221 | B1 | * | 1/2004  | Jacobs ........................... 707/5 |
| 2001/0054049 | A1 | * | 12/2001 | Maeda et al. ............... 707/517 |
| 2002/0002567 | A1 |   | 1/2002  | Kanie et al. |
| 2002/0010715 | A1 | * | 1/2002  | Chinn et al. ................ 707/514 |
| 2003/0005001 | A1 | * | 1/2003  | Kataoka ..................... 707/513 |
| 2003/0177443 | A1 | * | 9/2003  | Schnelle et al. ............ 715/513 |
| 2006/0010375 | A1 | * | 1/2006  | Salesin et al. .............. 715/517 |

FOREIGN PATENT DOCUMENTS

| EP | 0 747 836 A1 | 12/1996 |
|---|---|---|
| JP | 09-319632 A  | 12/1997 |

OTHER PUBLICATIONS

Microsoft Word Guide 2002 pp. 1-11.
Wang et al, X-Diff: An Effective Change Detection Algorithm for XML Documents.

* cited by examiner

*Primary Examiner*—Stephen Hong
*Assistant Examiner*—Kristina Honeycutt
(74) *Attorney, Agent, or Firm*—Birch, Stewart, Kolasch & Birch, LLP (57) ABSTRACT

A system for constructing, in a storage device of a computer, data expressing a document to be revised as an XML document, in which a volume, a chapter, a clause, an item, a section, a sub-section, a paragraph and the like of the document to be revised are expressed as a tree structure is provided. An element corresponding to a branch node of tree structured data is assigned a set of a unique revision ID and an attribute representing a type of the revisions written in a list structure every time a revision is made and the element prior to the revision is saved so that a revision operation of the element is performed using the information.

12 Claims, 2 Drawing Sheets

Fig.3

DOCUMENT REVISION SUPPORT PROGRAM AND COMPUTER READABLE MEDIUM ON WHICH THE SUPPORT PROGRAM IS RECORDED AND DOCUMENT REVISION SUPPORT DEVICE

This nonprovisional application claims priority under 35 U.S.C. § 119(a) on Patent Application Ser. No(s). 2002-289628 filed in JAPAN on Oct. 2, 2002, which is(are) herein incorporated by reference.

BACKGROUND OF THE INVENTION

The present invention is directed to a system for supporting a document revision process.

There has been a demand to keep document revision histories for future use. Conventionally, revision histories have been kept in the form of paper documents by simply jotting down changes directly onto the documents, or a copy of a revised document has been made and kept on a generation-by-generation basis, or a revised document file for each generation has been saved using a file function of a word processor and the like. As a more advanced means of keeping document revision histories, a technique for retaining a differential between an original document and a revised document has been employed. One of the most prevalently used means at present is a revision record function and format for saving revision histories provided by application software Microsoft Word®.

The aforementioned conventional means of keeping revision histories are in some ways inconvenient. For example, when keeping revision histories in the form of paper documents, not only is proper maintenance of such paper documents difficult but also substantial storage space is needed. Even with the use of electronic files of word processors and the like, there is a limit to what one can do to control document revision histories, such as recording the generation of several revisions at an optional time to compare the same with the other recorded generation of revisions, retrieving a document of a previous generation to replace a document of the current generation or making further changes to a revision of a previous generation. Thus, the conventional means is inadequate and cannot meet the need for strict control of revision histories in revising laws, ordinances and special documents such as legal documents, patent specifications, industrial codes, documents relating to financial matters, specifications, instruction and other manuals, office regulations, bylaws, and the like. In other words, it requires the following functions that cannot be implemented by the conventional means to meet the aforementioned needs:

1) To automatically generate from a revision record a "revision description" that specifically describes the contents of a revision made at certain point in time;
2) To selectively cancel a specific revision among multiple revisions that are intricately related to one another;
3) To concurrently perform a multiplicity of revision operations on the same document;
4) To control multiple revisions independently of one another and selectively reflect the contents of the revisions in the original document;
5) To automatically generate a cross reference table comparing a document before a revision with the document after the revision; and
6) To inspect the content of an optional revision in a document.

The above functions are essential especially when revising laws and ordinances and the like, and the conventionally available technique not only requires enormous time and manpower but is also prone to errors.

SUMMARY OF THE INVENTION

An object of a document revision support system of the present invention is to obviate the aforementioned problems of the prior art. Therefore, the present invention provides a means for saving documents in an XML format and also keeping whole revision histories of the documents in the XML documents, and achieves the above object by providing such an XML document processing system.

More specifically, the present invention provides a means for adding attributes and elements for saving document revision histories to schema (document type definition DTD) in XML prescribed for saving documents, thereby recording and saving not only documents but also the documents' revision histories including the order in which the revisions were made. In other words, the present invention provides a means for referencing and controlling a differential for each structure of an XML document. Further, the present invention realizes a system for automatically generating, by using recorded and saved revision history data, a "revision description" that specifically describes the contents of a revision made at a certain point in time, selectively canceling a specific revision of multiple revisions that are intricately related to one another, concurrently performing a multiplicity of revision operations on the same document, controlling multiple revisions independently of one another and selectively reflecting the contents of the revisions on the original document, automatically generating a cross reference table comparing a document before a revision with the document after the revision and inspecting the content of an optional revision in a document.

A document revision support system of the present invention is able to support operations for revising various documents whose revision histories need to be strictly controlled and is especially effective in supporting an operation for revising laws and ordinances and the like, which require a complex revision operation in strict compliance with a prescribed format.

In revising laws and ordinances and the like, it is necessary to record as revision histories the contents of revisions of a document as well as the order in which the revisions were made, to generate on the basis of the thus recorded histories a "revision description (revised law or revised ordinance)" succinctly describing the contents of a revision at a certain point in time and to prepare a cross reference table comparing a document before a revision with the document after the revision. It is sometimes necessary to also inspect the content of an optional revision made in a document.

Further, it is necessary to selectively cancel a specific revision (draft withdrawing processing) of multiple revisions that are intricately related to one another or selectively reflect a specific revision in an original document (assimilation processing), depending on whether or not the revision of a document is acceptable.

Figure 1:
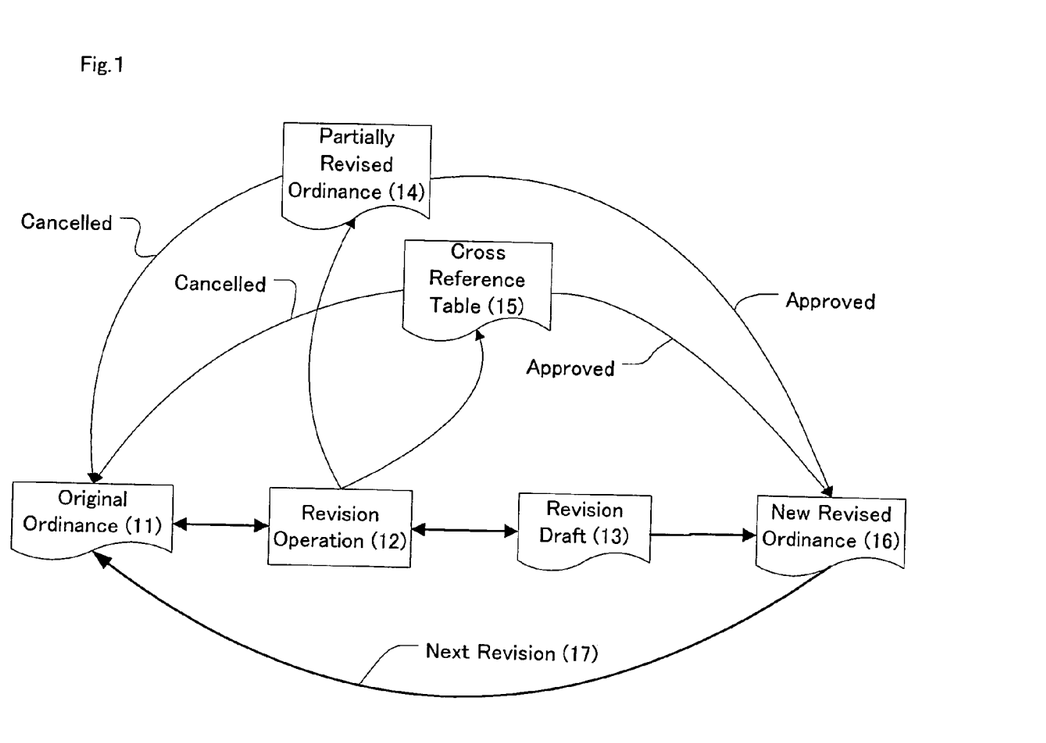
FIG. 1 is a flow chart describing an example of a document revision operation.

The above operation is described in the flow chart in FIG. 1. In FIG. 1, the numerical symbol (11) denotes an original ordinance to be revised, that is, an object of a revision. Performing a revision operation (12) on original ordinance (11), a revision draft (13) is prepared. A relationship between original ordinance (11) and revision draft (13) is denoted by a partially revised ordinance (14), whereas a cross reference table comparing the new version with the old version (15) is prepared. If partially revised ordinance (14) is approved upon deliberations at the Diet, a council meeting or the like, it is promulgated as a revised ordinance (16). Otherwise, an operation for reinstating original ordinance (11) is performed. A new revised ordinance (16) is regarded as an original ordinance at the next revision (17).

Figure 2:
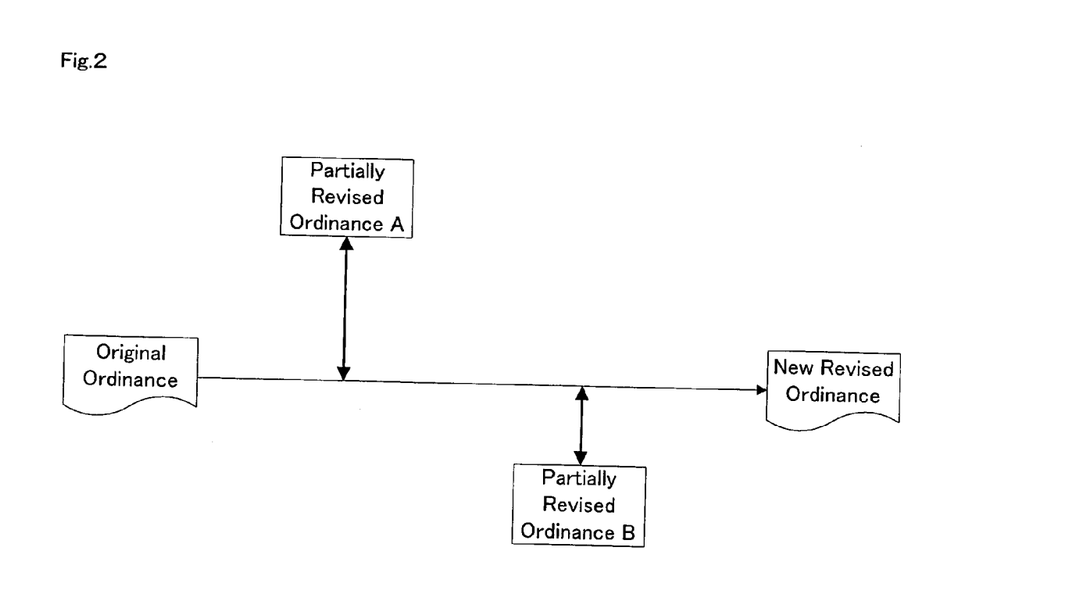
FIG. 2 is a flow chart describing how multiple revision operations illustrated in FIG. 1 are performed concurrently.

Since multiple revision operations are sometimes performed on the same document concurrently as is illustrated in FIG. 2, the aforementioned functions must be implemented without causing any discrepancy among the multiple revisions.

To comply with the above-described requirements, a document revision support system of the present invention constructs, in a storage device of a computer, data expressing a document to be revised as an XML document, in which a volume, a chapter, a clause, an item, a section, a sub-section, a paragraph and the like of a document to be revised are expressed as a tree structure, provides to an element corresponding to a branch node of tree structured data a set of a unique revision ID and an attribute representing a type of the revisions written in a list structure every time a revision is made and saves in the element the original document prior to the revision so that a revision operation of the element is performed using the information.

Hereafter, a structure of such information and an embodiment of such an operation system will be specifically described by using as an example an operation of revising an ordinance.

DETAILED DESCRIPTION OF THE INVENTION

In systematizing processing for generating a revision description, a cross reference table comparing the new version with the old version and a promulgated document, a revision ID for uniquely identifying a location of a revision is provided to each revision location (version) in an ordinance XML (XML data, in which a volume, a chapter, a clause, an item, a section, a sub-section, a paragraph and the like of a law or ordinance to be revised are expressed as a tree structure) with a view to realizing automatization of draft withdrawing processing and assimilation processing on an entire or partial ordinance structure. Once a revision ID is assigned to a revision location, the revision ID will never be changed.

By designating a revision ID, draft withdrawing/assimilation processing is conducted. The processing includes assimilation processing to be conducted for a revision ID subsequent to the designated revision ID and draft withdrawing processing conducted for a revision ID preceding the designated revision ID. Further, as information that forms a set of information with a revision ID, at least one of the following attributes and revision types is added to the document schema (DTD) of the ordinance XML as needed.

(1) Revise Attribute

A revise attribute is an attribute for adding revise information to a location of a revision. It is a list of sets of a revision ID (version information) representing edits performed on a document and a revision type representing a type of a revision made to each element. For example, following is a list showing two revisions A and B made to an element X:

<element X revise="revision A added revision B erased">

In the above list, the element X represents an element of an ordinance document such as a 'volume', a 'chapter', a 'clause', an 'item', a 'section', a 'sub-section', a 'paragraph' and the like, and (revision A added) and (revision B erased) both represent a set of a revision ID and a type of a revision and the order that (revision A added) and (revision B erased) appear in the list corresponds to the order in which the revisions A and B were made. Although the above example concerns an ordinance document, the same as above is applicable to an ordinary document element (as opposed to a legal document element) such as a 'chapter', a 'section', a 'paragraph' and the like and therefore, in the examples described below, a description such as <element X> . . . </element X> and the like may be optionally replaced by <chapter> . . . </chapter>, <article> . . . </article>, <paragraph> . . . </paragraph> and the like. By describing as illustrated above, it becomes possible to express not only multiple revisions made to an element in the document but also the order in which the revisions are made.

Types of revisions are defined as follows:
(a) removed: removing an element
(b) erased: erasing an element. The numbering sequence of any elements which follow is advanced.
(c) added: adding an element. The numbering sequence of any elements which follow recedes.
(d) partial: partial revision (revision of a character or a phrase)
(e) overall: overall revision. The original document is saved.
(f) revival: An overall revision is made to the removed elements (almost the same as the above (e)).
(g) collapsed: Effective for a 'volume', a 'chapter', a 'clause', an 'item' and a 'section'. Removing a chapter name or a section name.
(h) divided: dividing a volume, a chapter, a section, a title, an item and a section.

Next, the aforementioned types of revisions will be respectively described. For each of the types of revisions made to a document or an element in the document, the algorithms for application (assimilation processing) and cancellation (draft withdrawing processing) will be also described.

(a) Removed

A revision "removed" means that element X has been "removed". That an element has been "removed" does not mean that the element has been removed from a document but means that the content of the element becomes invalid in the document. For example, this corresponds to the case where the number denoting a specific section is retained (e.g., the numerical symbol '1' in Section. 1 is retained) and the content of the section is marked "removed". (In the specific example given below, a document expressed in XML language above the downward arrow ↓ corresponds to an XML document prior to a revision, whereas one below the downward arrow ↓ corresponds to an XML document after the revision.)

```
<element X removed="no">
    <element Y>...</element Y>
</element X>
        ↓
<element X removed="yes" revise="revision A removed">
    <element Y>...</element Y>
</element X>
```

A flag in a document that indicates whether the content of an element is valid or not is a removed attribute value.

This indicates that an element which could be removed as a removed attribute.

When a change "removed" (revision A) is applied, "revision A removed" is removed from the revise attribute and further, when the revise attribute value becomes " ", the revise attribute is removed from the element X to make the XML document as follows:

```
<element X removed="yes">
    <element Y>...</element Y>
</element X>
```

Thus, the removed attribute becomes yes and the element becomes invalid in the document.

On the other hand, when a change "removed" (revision A) is cancelled, "revision A removed" is removed from the revise attribute and make the removed attribute value no.

As is clear from the above, by designating a revision ID, assimilation processing and draft withdrawing processing can be performed in all attributes at once.

(b) Erased

A revision "erased" means that the element X is "erased". That an element is "erased" means that an element is removed from a document, which corresponds to a case, for example, where not only a specific numerical symbol denoting a section but also the content of the section are removed from a document. In this case, the numbering sequence of any sections that follow the erased section is advanced. A process for advancing the numbering sequence will be described later.

```
<element W>...</element W>
<element X>
    <element Z>...</element Z>
</element X>
<element Y>...</element Y>
        ↓
<element W>...</element W>
<element X revise="revision A erased">
    <element Z>...</element Z>
</element X>
<element Y>...</element Y>
```

When the revision A "erased" is applied, the element X is completely removed from the document to make the XML document as follows:

```
<element W>...</element W>
<element Y>...</element Y>
```

When the revision A "erased" is cancelled, "revision A erased" is removed from the revise attribute and further, when the revise attribute value becomes " ", the revise attribute is removed from the element X.

(c) Added

A revision "added" means that the element X is added. When the element X is added, the numbering sequence of any sections that follow the "added" section recedes. Processing conducted for such a change in the numbering sequence will be described later.

```
<element W>...</element W>
<element Y>...</element Y>
        ↓
<element W>...</element W>
<element X revise="revision A added">...</element X>
<element Y>...</element Y>
```

When the revision A "added" is applied, "revision A added" is removed from the element X and further, when the revise attribute value becomes " ", the revise attribute is removed from the element X to make the XML document as follows:

```
<element W>...</element W>
<element X>...</element X>
<element Y>...</element Y>
```

On the other hand, when the revision A by which the element X was added is cancelled, the element X is completely removed from the document.

(d) Partial

A revision "partial" means that a partial revision of a character or phrase is made to an element in which PCDATA (text) and character modifier tags and the like are mixed in an XML document. For example, when a character phrase revision is made to a sentence "It is fine today." to generate a sentence "It's fine today again.", the revision "partial" proceeds as follows:

```
<element X>It is<em>fine</em>today.</element X>
        ↓
<element X revise="revision A partial">
    <del revise_id="revision A">It is</del> <ins revise_id="revision A">It's</ins><em>fine</em>today<ins revise_id="revision A">again</ins>.
</element X>
```

In a character phrase revision, an inserted character string is expressed by an ins tag and a removed character string is expressed by a del tag. Further, both tags are respectively provided with a revise_id attribute representing a revision A.

When the revision A by which a character phrase revision was made is applied, "revision A partial" is removed from the revise attribute. Further, the del tag whose revise_id attribute value is "revision A" is removed and a child of the ins tag whose revise_id attribute value is also "revision A" is inserted before the ins tag and the ins tag is removed in the end.

```
<element X revise="revision A partial">
    It's<em>fine</em>today again.
</element X>
```

When the revision A by which a character phrase revision was made is cancelled, "revision A partial" is removed from the revise attribute. Further, the ins tag whose revise_id attribute value is "revision A" is removed and a child of the del tag whose revise_id attribute value is "revision A" is inserted before the del tag and the del tag is removed in the end.

(e) Overall

A revision "overall" means that an element is wholly revised. In order to save the former content of the original element prior to the overall revision, the entire former content is saved in the original element unlike a "partial" revision where only a difference between the current content and the former content is saved. A revision ID is saved in a revise_id attribute of an original element. How to revise a full text of an element Z to an element ZZ (a character string of "AAAAA" in this example) will be described below.

```
<element X>
    <element Z >...</element Z>
</element X>
        ↓
<element X revise="revision A overall">
    <element ZZ>AAAAA</element ZZ>
    <original revise_id="revision A">
        <element X>
            <element Z>...</element Z>
        </element X>
    </original>
</element X>
```

When an overall revision is applied, "revision A overall" in the revise attribute of the element X is removed and further, when the revise attribute value becomes " ", the revise attribute is removed from the element X and the original element is removed to make the XML document as follows:

```
<element X>
    <element ZZ>AAAAA</element ZZ>
</element X>
```

On the other hand, when the overall revision is cancelled, the element X is replaced by one in the original element.

(f) Revival

A revision "revival" means that a removed element (removed="yes"), that is, an element that is invalid in the document, is revived. Although "revival" revision processing is basically the same as revision "overall" processing, it is effective only for a removed element. A revision "revival" corresponds to a case where after it is decided when revising an ordinance that a revision "removed" will be conducted on a provision of the ordinance, it transpires that the provision needs to be revived for some reason.

(g) Collapsed

A revision "collapsed" means that when elements X1 and X2 of the same kind appear one after another, a division by the element X2 is eliminated. A revision "collapsed" corresponds to a case where a "volume", a "chapter", a "clause", an "item", a "section" and the like are removed.

```
<element X1>
    <element Z1>...</element Z1>
</element X1>
<element X2>
    <element Z2>...</element Z2>
</element X2>
        ↓
<element X1>
    <element Z1>...</element Z1>
</element X1>
<element X2 revise="revision A collapsed">
    <element Z2>...</element Z2>
</element X2>
```

When revision A by which the division by the element 2 is eliminated is applied, a child of the element X2 is transferred to the end of a child of the element X1, which corresponds to its brother, and the element X2 is removed from the document to make the XML document as follows:

```
<element X1>
    <element Z1>...</element Z1>
    <element Z2>...</element Z2>
</element X1>
```

When revision A by which the division of the element X2 is eliminated is cancelled, "revision A collapsed" is removed from the revise attribute of the element X2 and further, when a revise attribute value becomes " ", the revise attribute is eliminated from the element X2.

(h) Divided

A revision "divided" means that a division of an element is added to thereby divide a child of the element. Revision "divided" processing is a reverse operation of revision "collapsed" processing and corresponds to a case where a "volume", a "chapter", a "clause", an "item", a "section" and the like are added.

```
<element X1>
    <element Z1>...</element Z1>
    <element Z2>...</element Z2>
</element X1>
        ↓
<element X1>
    <element Z1>...</element Z1>
</element X1>
<element X2 revise="revision A divided">
    <element Z2>...</element Z2>
</element X2>
```

When the revision by which a division is added is applied, "revision A divided" is removed from the revise attribute of the element X2.

On the other hand, when the revision by which a division is added is cancelled, a child of the element X2 is transferred to the end of a child of the element X1 corresponding to a brother of the element X2 and the element X2 is removed from the document.

(2) Num Attribute

A num attribute is an attribute representing a numerical symbol denoting a provision of an ordinance and is expressed in the x.y.z form, wherein x is a branch number of a depth 0, y is a branch number of a depth 1 and z is a branch number of a depth 2. More specifically, "2.2.2" is a numerical symbol of a depth 2, "3.3" is a numerical symbol of a depth 1 and "1" is a numerical symbol of a depth 0. A numerical symbol is automatically input or changed such that a discrepancy (redundancy or dropout of numerical symbols) does not arise. By using a dialog designating a location where element Z with a numerical symbol is to be added for designating element X with a numerical symbol, the element Z is inserted after the designated element X. When setting a branch number, a branch number equal to 1+a numerical symbol representing a depth of a branch number of the element X can be set. In this example (numbering provisions of an ordinance), a branch number of a depth 1 or above starts from 2 (1 is never set). For example, if the branch number of the element X is "5", that of the element Z should start from "5.2" and if the branch number of the element X is "4.2", that of the element Z should start from "4.2.2".

(3) Preset Attribute

A preset attribute is an attribute for processing to carry up/down a number denoting a provision of an ordinance and is expressed as a list of sets of a revision ID (version) representing edits performed on a document and a numerical symbol of an element in the revision ID.

When a number needs to be carried up or down as a result of a revision, a num attribute value per se representing the number is not changed but the number the original number has been changed to as a result of the revision as well as the order in which they have been changed is controlled for each revision.

A preset attribute is imparted to an element with a numerical symbol (num attribute) and an element whose numerical symbol needs to be carried up/down as a result of removal/addition of another element.

For example, when a new element X11 is added after the element X1 by the revision A made to the following original data:

```
<element X1 num="1">...</element X1>      //1
<element X2 num="2">...</element X1>      //2
<element X3 num="3">...</element X1>      //3
``` the following operation is performed on the above data: (a sentence following the symbol // is a comment made solely for making the operation easier to understand).

```
<element X1 num="1">...</element X1>      //1
<element X11 num="2" revise="revision A added">...</element X1>      //2 (new)
<element X2 num="2" preset="revision A 3">...</element X1>
    //2 is carried down to 3
<element X3 num="3" preset="revision A 4">...</element X1>
    //3 is carried down to 4
```

Further, when the element X2 is erased by the same revision A, the following operation is performed:

```
<element X1 num="1">...</element X1>      //1
<element X11 num="2" revise="revision A added">...</element X1>      //2 (new):revision A
<element X2 num="2" preset="revision A 3" revise="revision A erased">...</element X1>
<element X3 num="3">...</element X1>      //4 is carried up to 3
```

Now that the element X3 is carried back up to 3 from 4 and the numerical symbol 3 is the same as that assigned prior to the revision A, the preset attribute is removed.

On the other hand, when the element X2 is erased by revision B, the following operation is performed.

```
<element X1 num="1">...</elementX1>      //1
<element X11 num="2" revise="revision A added">...</element X1>      //2 (new):revision A
<element X2 num="2" preset="revision A 3" revise="revision B erased">...</element X1>
<element X3 num="3" preset="revision A 4 revision B 3">...</element X1>      //3 is carried down to 4 (revision A), which is then carried up to 3 (revision B)
```

When revision A is applied, an element whose preset attribute contains the revision A changes its value to a value of a num attribute to thereby remove "revision A number" from the revise attribute. The above example can be illustrated as follows:

```
<element X1 num="1">...</element X1>      //1
<element X11 num="2">...</element X1>      //2
<element X2 num="3" revise="revision B erased">...</element X1>
<element X3 num="4" preset="revision B 3">...</element X1>
    //4 is carried up to 3 (revision B)
```

On the other hand, when the revision B is withdrawn, "revision B number" is removed from the preset attribute. In this case, the above indicated element X3 becomes as follows:

```
<element X3 num="4">...</element X1>
```

Thus, when an element is added to/erased from elements with numerical symbols denoting a "volume", a "chapter", a "clause", an "item", a "section", a "sub-section" and a "paragraph" and the like, the numbering sequence of volumes, chapters, clauses, items, sections, sub-sections, paragraphs and the like can be advanced or recede by the above-described processing.

However, even though a provision is added as a branch number, it does not necessarily affect the numbering sequence.

For example, when an ordinance originally has Article 1 and Article 2 and Article 1.2 needs to be added, the numerical symbol 2 in Article 2 is not carried down. In this case, "1.2" is set as a num attribute for Article 1.2 and a preset attribute is not imparted. Similarly, when an ordinance originally has Article 1, Article 1.2, Article 1.3 and Article 2, the numerical symbol 2 in Article 2 is not carried up if the Article 1.3 is erased from the original.

Further, as for an element of a provision added by the current revision A, when a numerical symbol is carried up or down as a result of the current revision and another revision, an operation is not performed on a preset attribute but a num attribute value per se is directly manipulated. For example, when a new Article 2 is added between Article 1 and Article 2, data changes as follows:

```
<article num="1">...</article>
<article num="2" revise="revision A added">...</article>
<article num="2" preset="revision A 3">...</article>.
```

If Article 1 is further erased, the following operation is performed:

```
<article num="1" revise="revision A erased">...</article>
<article num="1" revise="revision A added">...</article>
    //num attribute is changed
<article num="2">...</article>        //2 is the same
numerical symbol as that prior to the revision A
```

This is because as the element added by the current revision does not have "a numerical symbol prior to the revision" and therefore, there is no "numerical symbol prior to revision" that needs to be saved, a preset attribute does not need to be employed.

Such a data structure as described above which employs a set of a revision ID and an attribute makes it possible to keep multiple revisions independent of one another and to selectively reflect the content of each revision on one another.

Next, (a) where multiple partial revisions are made concurrently and (b) where a partial revision and a partial revision of the partial revision are made concurrently will be specifically described below.

First, a provision "Article 1 A is an animal." will be used as an example.

(a) Where multiple partial revisions are made concurrently

It is assumed that the following revisions will be made:
1. A first provision reflects the content of a partial revision of February 14.
2. A second provision reflects the content of a partial revision of March 14.

Assuming here that as of February 10, data contains the following structure.

```
<article num="1" revise="r20020214 r20020331">
<p> <del revise="r20020214">A</del> <ins
revise="r20020214">B</ins>is<del revise="r20020331">an
animal</del> <ins revise="r20020331">mammal</ins>.</p>
</article>
```

Conducting revision description generation only on an element having revise="r20020214", "'A' in Article 1 is revised to 'B'." is generated.

At the time of the revision of February 14, the following assimilation processing is performed:

When assimilation processing is performed on an element having revise="r20020214", the data becomes as follows:

```
<article num="1" revise="r20020331">
<p>B is an<del revise="r20020331">animal</del> <ins
revise="r20020331">mammal</ins>.</p>
</article>
```

Next, conducting revision description generation only on an element having revised="r20020331", "'animal' in Article 1 is revised to 'mammal'." is generated.

At the time of the revision of March 31, the following assimilation processing is performed. In other words, when assimilation processing is performed on an element having revise="r20020331", the following data is generated:

```
<article num="1">
<p>B is a mammal.</p>
</article>
```

(b) When a partial revision and a partial revision of the partial revision are made.

It is assumed here that the current data is as follows:

```
<article num="1" revise="r20020214">
<p> <del revise="r20020214">A</del> <ins
revise="r20020214">B</ins>is an animal.</p>
</article>
```

Edits are performed on the above data such that the above data becomes as follows:

```
<article num="1" revise="r20020210 r20020214">
<p><del revise="r20020210">A</del><ins
revise="r20020214"><del revise="r20020210">B</del><ins
revise="r20020210">C</ins></ins>is an animal.</p>
</article>
```

This means that it is appropriate to make a partial revision of the partial revision to be made before February 14. Thus, it is assumed that the date is set to be February 10.

Conducting revision description preparation only on an element having revise="r20020210", "'B' in Article 1 is revised to 'C'." is generated.

The above revision description is a correct content of a partial revision of the partial revision.

Thus, after the assimilation processing of February 10, the data becomes as follows:

```
<article num="1" revise="r20020214">
<p> <del revise="r20020214">A</del><ins
revise="r20020214">C</ins>is an animal.</p>
</article>
```

Conducting revision description generation here, "'A' in Article 1 is revised to 'C'." is generated.

The above revision description is also a correct content as a partial revision.

Next, at the time of the revision of February 14, the following assimilation processing is conducted. In other words, performing assimilation processing only on an element having revise="r20020214", the following data is generated as a result of the assimilation processing:

```
<article num="1">
<p>C is an animal.</p>
</article>
```

Figure 3:
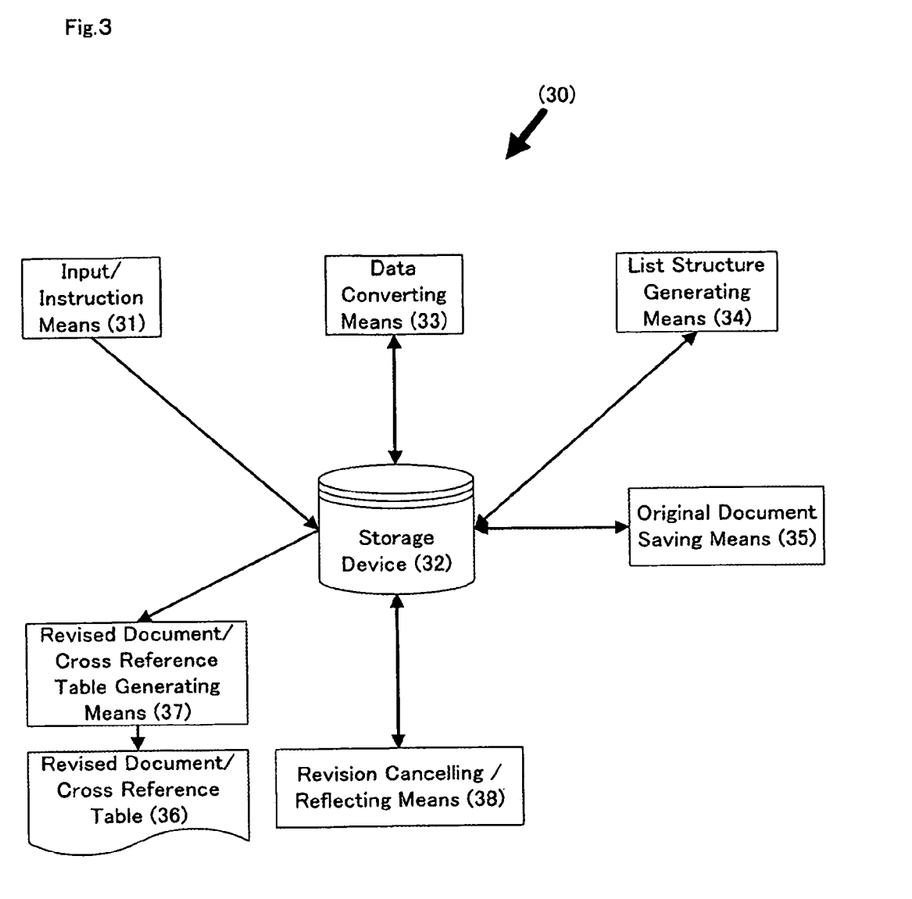
FIG. 3 is a block diagram of a document revision support system of the present invention.

A document revision support system employing the above data structure is realized by synergy of hardware resources of a computer system and software illustrated in FIG. 3. In FIG. 3, the numerical symbol (30) denotes a document revision supporting device in accordance with the present invention, which comprises: means (31) for inputting a document to be revised; a storage device (32) for storing an input document to be revised and data being processed; means (33) for converting an input document to be revised to data expressed in a tree structure; means (31) for designating an element of stored data and instructing to revise the element; means (34) for generating a list structure consisting of sets of a revision ID uniquely representing a designated revised version and a type of revision to be made to an element and storing the thus generated list structure in the tree structure data; means (35) for saving in the element the original prior to the revision; means (37) for designating a specific revision ID and generating a cross reference table for comparing a revised document or revised portion with the original by using the aforementioned element and attribute; and means (38) for designating a specific revision ID to delete the aforementioned revision ID and attribute and restore the saved document to thereby cancel the revision or delete the revision ID, attribute and saved original document by designating a specific revision ID, and further reflecting a revision represented by the attribute on the original and the like.

Of the aforementioned components, the input/instruction means (31) may be an input/output device such as a keyboard, scanner, voice input device, mouse and the like, and the storage device (32) may be a semiconductor memory device, memory device of a hard disk device and the like, and the converting means (33), generation means (34, 37), saving means (35) and cancel/reflection means (38) and the like are ideally comprised of CPU and various software modules (including firm ware). These components may be realized either on a single computer system or hardware distributed over a network. For example, a data base server on a network may be employed as the storage device (32), on which an XML document is stored, and the other input/output device and processing means (excluding means (32)) may be realized on a client machine connected to the network.

By implementing the aforementioned document revision support system, the present invention can perform the following functions, which are not provided by the prior art systems.

1. To automatically generate from a revision record a "revision description" that specifically describes the contents of a revision made at certain point in time.
2. To selectively cancel a specific revision among multiple revisions that are intricately related to one another.
3. To concurrently perform a multiplicity of revision operations on the same document.
4. To control multiple revisions independently of one another and selectively reflect the contents of the revisions on the original document.
5. To automatically generate a cross reference table comparing a document before a revision with the document after the revision; and
6. To inspect the content of an optional revision in a document.

As is clear from the above, a document revision support system of the present invention is able to satisfy the needs for stringent control of a record of revisions made to, for example, laws, ordinances, legal documents, patent specifications, various manuals, specifications, directories and the like and for strict control of revision histories of editing in the field of publishing and the like.

Although the above embodiment of this present invention has been described as a revision made to an ordinance, those skilled in the art will readily appreciate that the present invention is applicable to various documents. Therefore, it is to be understood that the constitution of the above embodiment is not to be construed as limiting of the present invention and many modifications that those skilled in the art could think out are intended to be included within the scope of this invention.

What is claimed is:

1. A method for providing document revision support, the method comprising:
   receiving a document to be revised;
   converting the received document to data presented in a tree structure;
   storing the converted data as a saved original;
   receiving an instruction to revise a designated element of the converted data;
   creating revised data to be stored in said tree structured data, said revised data including the instructed revision to the designated element and a revision ID uniquely representing the instructed revision and an attribute representing a type of the revision made to the designated element as list structure data;
   saving the revised data designating a specific revision to be canceled, deleting the revision ID and attribute corresponding to the specific revision, and restoring the saved original to thereby cancel the specific revision; and
   designating a specific revision to be deleted, deleting the revision ID and attribute corresponding to the specific revision as well as the saved original, and reflecting a revision represented by the attribute on the original.

2. The method as defined in claim 1, wherein said list structure data includes sets of data respectively including a revision ID and an attribute representing a type of a revision, where said sets of data are arranged in the order in which the respective revisions were made.

3. The method as defined in claim 1 or 2 further comprising:
   receiving a specific revision ID; and
   generating a revised document representing the revision corresponding to said specific revision ID using the corresponding element and attribute.

4. The method as defined in claim 1 further comprising:
   receiving a specific revision ID; and
   generating a cross reference table comparing a portion before said revision with a portion after said revision using the corresponding element and saved original.

5. A computer readable medium, on which a document revision support program is recorded, said program enabling a computer to execute a method comprising:
   receiving a document to be revised;
   converting the received document to data presented in a tree structure;

storing the converted data as a saved original;

receiving an instruction to revise a designated element of the converted data;

creating revised data to be stored in said tree structured data, said revised data including a revision ID uniquely representing the instructed revision and an attribute representing a type of the revision made to the designated element as list structure data;

saving the revised data;

designating a specific revision to be canceled, deleting the revision ID and attribute corresponding to the specific revision, and restoring the saved original to thereby cancel the specific revision; and designating a specific revision to be deleted, deleting the revision ID and attribute corresponding to the specific revision as well as the saved original, and reflecting a revision represented by the attribute on the original.

6. The computer readable medium as defined in claim 5, wherein said list structure data includes sets of data respectively including a revision ID and an attribute representing a type of a revision, where said sets of data are arranged in the order in which the respective revisions were made.

7. The computer readable medium as defined in claim 5 or 6 further comprising:

receiving a specific revision ID; and generating a revised document representing the revision corresponding to said specific revision ID using the corresponding element and attribute.

8. The computer readable medium as defined in claim 5 further comprising:

receiving a specific revision ID; and generating a cross reference table comparing a portion before said revision with a portion after said revision using the corresponding element and saved original.

9. A document revision support device comprising:

means for inputting a document to be revised;

means for converting the inputted document to data presented in a tree structure;

means for storing converted data as a saved original;

means for receiving an instruction to revise a designated element of the converted data;

means for creating revised data to be stored in said tree structured, said revised data including a revision ID uniquely representing the instructed revision and an attribute representing a type of a revision made to the designated element as list structure data;

means for saving the revised data;

means for designating a specific revision to be canceled, deleting the revision ID and attribute corresponding to the specific revision, and restoring the saved original to thereby cancel said revision; and means for designating a specific revision to be deleted, deleting the revision ID and attribute corresponding to the specific revision as well as the saved original, and reflecting a revision represented by the attribute on the original.

10. The document revision support device as defined in claim 9, wherein said list structure data includes sets of data respectively including a revision ID and an attribute representing a type of a revision, where said sets of data are arranged in the order in which the respective revisions were made.

11. The document revision support device as defined in claim 9 or 10 further comprising:

means for designating a specific revision ID; and means for generating a document representing the revision corresponding to said specific revision ID using corresponding element and attribute.

12. The document revision support program as defined in claim 9 further comprising:

means for designating a specific revision ID; and means for generating a cross reference table comparing a portion before said revision with a portion after said revision using the corresponding element and saved original.

* * * * *